United States Patent [19]

Zalewski

[11] 4,055,246

[45] Oct. 25, 1977

[54] FERRIS WHEEL TYPE PARTS WASHER

[75] Inventor: Norman G. Zalewski, Southgate, Mich.

[73] Assignee: Taylor & Gaskin, Detroit, Mich.

[21] Appl. No.: 657,240

[22] Filed: Feb. 11, 1976

[51] Int. Cl.[2] .............................................. B65G 47/00

[52] U.S. Cl. ...................................... 198/575; 134/66; 198/469; 198/614; 198/857

[58] Field of Search ............... 198/575, 577, 857, 859, 198/614, 469; 134/66

[56] References Cited

U.S. PATENT DOCUMENTS

| | | | |
|---|---|---|---|
| 2,794,536 | 6/1957 | Roza et al. | 198/575 |
| 2,808,922 | 10/1957 | Lutman | 198/575 |
| 2,979,062 | 4/1961 | Umbricht et al. | 134/66 |

*Primary Examiner*—Evon C. Blunk
*Assistant Examiner*—Douglas D. Watts
*Attorney, Agent, or Firm*—Burton, Parker & Schramm

[57] ABSTRACT

A ferris wheel type parts washer has its ferris wheel driven by a rotary fluid pressure motor under the control of a variable rate fluid flow control mechanism with means provided for sensing approaching registry of a parts supporting station on the ferris wheel with the parts transfer conveyor for slowing the rotation of the ferris wheel and with means sensing substantial registry of the parts supporting station and the parts transfer conveyor for stopping the fluid pressure motor and locking the ferris wheel in parts transfer registry with the conveyor, such locking means capable of camming the ferris wheel into parts transfer registry should it be slightly out of transfer registry when its movement is arrested. The disclosure shows mechanism for unlocking the ferris wheel and quickly accelerating it to maximum speed.

6 Claims, 8 Drawing Figures

FERRIS WHEEL TYPE PARTS WASHER

FIELD OF INVENTION

This invention relates to an industrial parts washer of the ferris wheel type in which the ferris wheel receives a plurality of parts at supporting stations about its periphery and during rotation the parts are sprayed with a washing liquid, and as each station reaches registry with a parts transfer conveyor the ferris wheel is stopped and locked in transfer registry with the conveyor so that parts may be transferred between a supporting station and the parts conveyor to load and unload the ferris wheel.

BACKGROUND OF THE INVENTION

In the art of industrial parts washers of the ferris wheel type, parts to be washed are delivered into and removed from the washer on a parts conveyor. A ferris wheel is supported in the washer and has a plurality of angularly spaced parts receiving and supporting stations around its periphery. The ferris wheel and parts conveyor operate in synchronized step-by-step relation. During pauses in the ferris wheel rotation the successive stations are in registry with the conveyor and the conveyor operates to deliver a part into the station and remove a part from the station ahead of the part being delivered. A part thus received on the ferris wheel is carried by it during subsequent step-by-step movements through a washing zone, the part being gradually inverted as the wheel rotates, and jets of washing liquid are played on the part to clean it. The part eventually returns to the starting point and is discharged from the ferris wheel and another part takes its place in the station. One or more such ferris wheels may be provided in the washer.

The foregoing generally described arrangement is disclosed in U.S. Pat. No. 2,979,062. As the parts to be washed in such a machine are often fairly heavy, such as internal combustion engine cylinder heads and the like, there is a considerable mass to be started and stopped during the step-by-step rotation of the ferris wheel. In addition it is necessary to accurately align each parts supporting station on the ferris wheel with the parts conveyor in order to effect transfer from one to the other. The mass of the parts to be washed taken with the mass of the ferris wheel and its associated drive train presents problems in effecting smooth starting, stopping and proper registry of each station with the parts conveyor.

Two approaches to rotating the ferris wheel and stopping it with successive stations aligned with the parts conveyor have been suggested. One is disclosed in U.S. Pat. No. 2,979,062 wherein a drive wheel connected to the ferris wheel is provided with a series of holes near its periphery. An arm is swingably mounted adjacent the drive wheel and carries a cross-wise extending hydraulic cylinder and piston, the piston being shiftable into and out of the holes. Another hydraulic cylinder and piston are connected to the free end of the arm to swing it back and forth. Still a third cylinder and piston are arranged adjacent the drive wheel with the piston shiftable into and out of the holes to lock the drive wheel and consequently the station on the ferris wheel in alignment with the parts conveyor. Operation of the three cylinders is synchronized to rotate the drive wheel in a step-by-step manner and lock it in position to allow transfer of parts between the ferris wheel stations and the parts conveyors. According to the second approach two hydraulic cylinders and a rotary hydraulic actuator are utilized.

Both of these approaches are expensive and neither provides a smooth starting and stopping action.

SUMMARY OF THE INVENTION

According to my invention I provide a ferris wheel indexing mechanism which utilizes only one hydraulic cylinder and piston for locating and locking the ferris wheel with its parts supporting stations in parts transfer registry with the parts conveyor, and one hydraulic motor for rotating the ferris wheel. Thus I eliminate at least one hydraulic motion vis-a-vis the prior art. A control system synchronizes operation of these two indexing components. In a preferred form of the mechanism the hydraulic motor is operated by a hydrostatic system which is so constructed and arranged that as a parts station on the ferris wheel approaches the parts conveyor, the ferris wheel is first slowed and thereafter stopped thus eliminating the shock of suddenly arresting its motion as in the prior art, and in addition the ferris wheel can be rotated at a higher speed during the major portion of its travel between pauses and at a slow speed only during the final approach of a station to the parts conveyor.

Advantages of my indexing mechanism over the prior art include the following:

1. The acceleration and deceleration of the ferris wheel can be infinitely adjusted to suit the load;
2. Instead of three individual motions provided by the three hydraulic devices of the prior art, in my system only two hydraulic motions are involved;
3. The control system of my drive mechanism is simplified by reducing the number of motions from three to two;
4. The mechanism is both cleaner and quieter in operation;
5. No shock is produced when rotating the ferris wheel regardless of torque applied thereto;
6. The indexing system is capable of producing a higher torque advantage; and
7. Cost of the washer is reduced by eliminating the third motion and its efficiency and life are improved by rotating the ferris wheel faster during the major portion of its movement and slowing it for an interval just before it is stopped.

BRIEF DESCRIPTION OF PREFERRED EMBODIMENT

Figure 1:
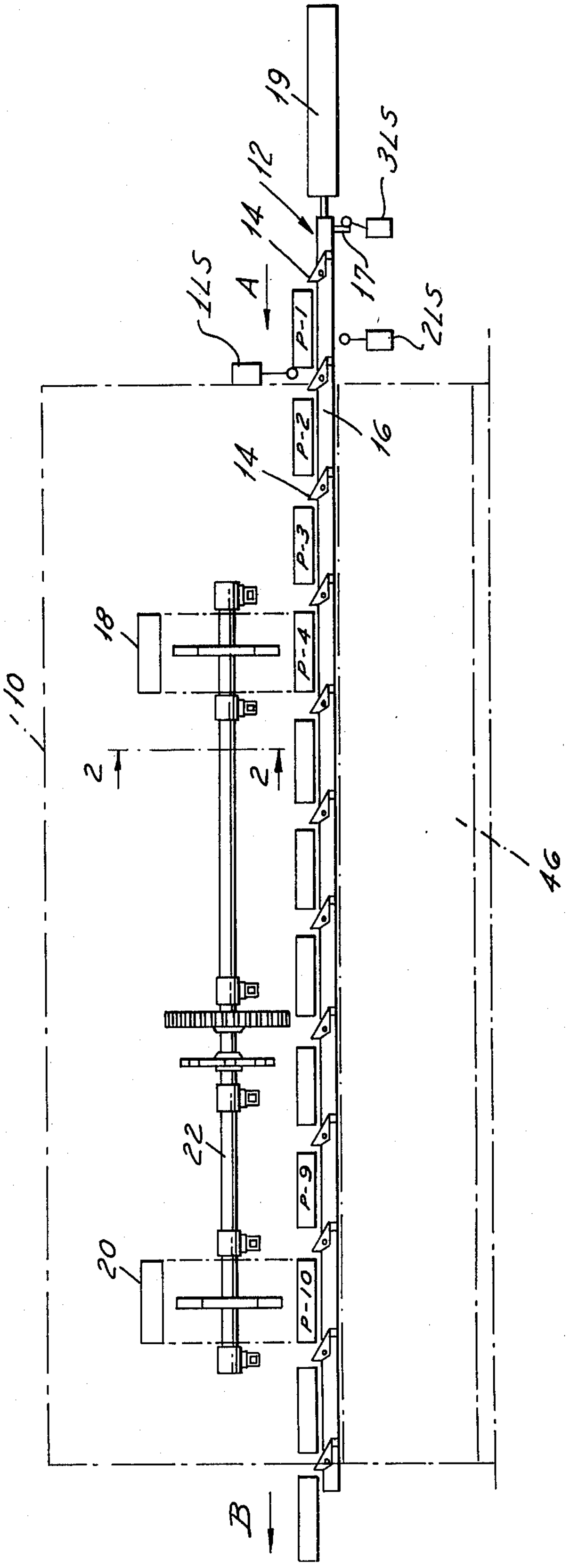
FIG. 1 is a schematic side elevation of an industrial parts washer of the ferris wheel type embodying my invention.

As shown in FIG. 1 the parts washer includes a housing 10 of conventional construction with a parts conveyor 12 extending therethrough for delivering parts into the washer in the direction of arrow A and removing parts therefrom in the direction of arrow B. The parts P to be washed rest upon suitable guideways (not shown) and are shifted along in a step-by-step motion by pivoted dogs 14 mounted on a reciprocating beam or the like 16. Suitable power means, schematically shown as a fluid pressure actuator 19, is connected to the beam 16 for reciprocating the beam such that the dogs push the parts as the beam shifts to the left and when the beam retracts the dogs pivot beneath the parts, back to their starting position, whereupon further reciprocation of the beam will shift the parts to the left as shown in FIG. 1. Such construction is conventional and need not be described in detail.

Two ferris wheels 18 and 20 are disposed within the housing mounted on a common shaft or the like 22. The shaft may be made up of individual shaft sections suitably coupled together. The shaft is supported within the housing by cross-frame members such as 24 and 26 shown in FIG. 4 and connected at opposite ends to the internal framework 28 of the housing 10. Journals 30 carried by the cross-members 24 and 26 support the shaft 22 for rotation. A sufficient number of cross-members and journals are provided to adequately support the shaft.

Figure 2:
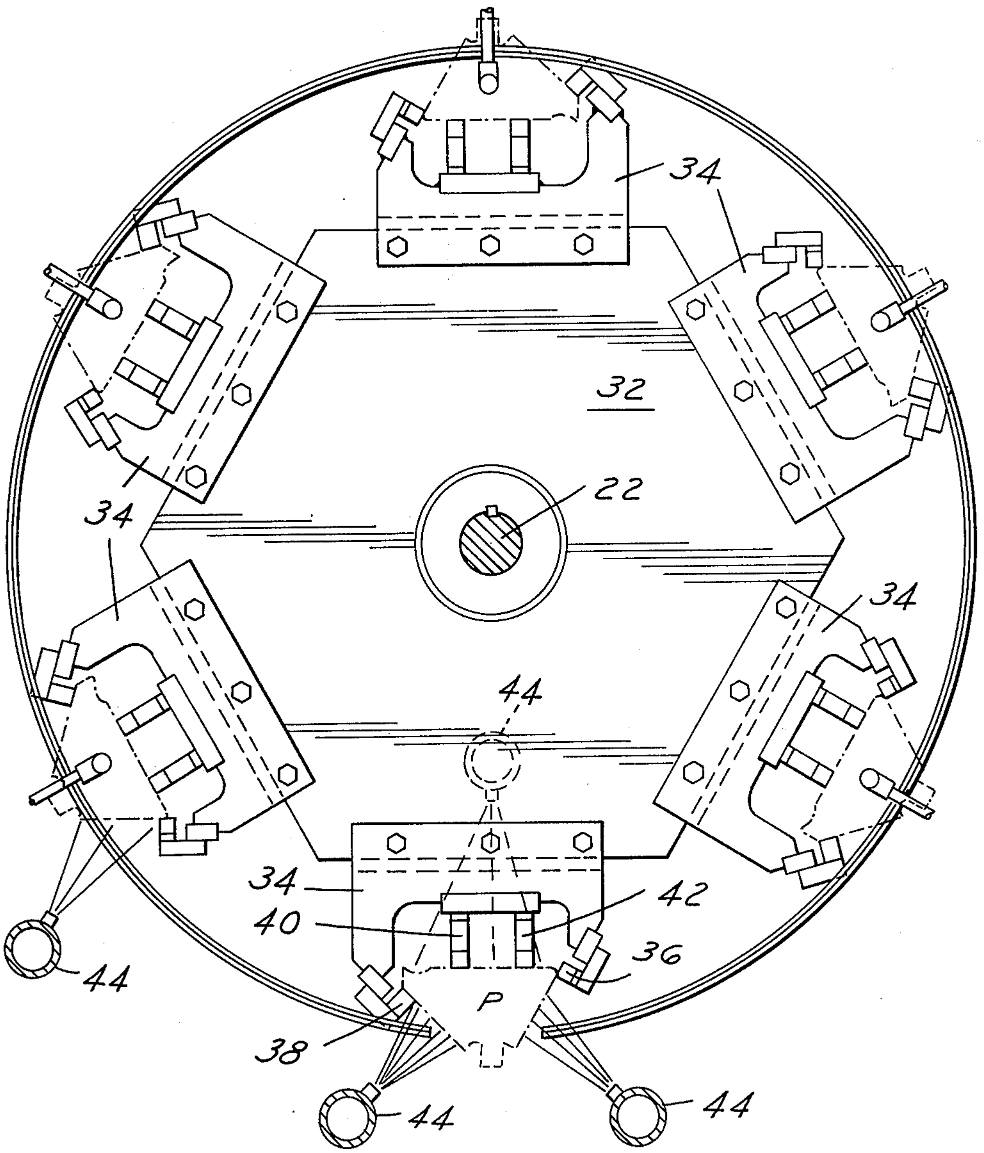
FIG. 2 is a cross-sectional view taken on the line 2—2 of FIG. 1 and showing one of the ferris wheels in the parts washer.

Each of the ferris wheels may comprise a pair of axially spaced apart hexagonally shaped plates securely affixed to the shaft 22 in any suitable fashion to rotate therewith and one such plate is shown in FIG. 2 at 32. Adjacent the straight edges of the hexagonal plates are parts receiving and supporting stations defined by brackets 34 which are spaced equiangularly around the shaft 22. The precise configuration of the brackets 34 will depend upon the shape of the parts to be washed. In the embodiment shown the brackets include cooperating opposed parts supporting members 36, 38, 40 and 42 arranged to abut opposed surfaces of the parts and retain them in the station. The members 36–42 form continuations of the parts supporting guideways (not shown) of the parts conveyor 12, the guideways being interrupted at the ferris wheel to allow the members 36–42 to be swung therethrough during rotation of the ferris wheel and positioned within the interruption or gap in the guideways. The parts supporting members 36–42 may be provided with any suitable parts supporting or engaging surface material to minimize scratching of the parts. The precise construction of the ferris wheel and the parts supporting brackets are conventional in the prior art and need not be further described.

Positioned around each ferris wheel are a series of washing jets 44, three of which are shown in FIG. 2, which are arranged to direct streams of washing fluid against the parts during their movement with the ferris wheel. As will be evident from FIG. 2, a part shown at the six o'clock position will successively move through 360° as the ferris wheel rotates and during such rotation the part will be inverted and then brought back to its original position at 6 o'clock. During such inversion the washing liquid sprays are directed against the part and into the interstices thereof and foreign matter is washed out of the parts and drains into a sump 46 in the bottom of the housing. Suitable pump means and piping are provided for delivering the washing fluid. This forms no portion of the invention but is conventional in the prior art and therefore is not further described. It is to be understood that the ferris wheel moves in a step-by-step motion and during pauses between the movements one of the parts supporting stations is in registry with the parts conveyor to permit transfer of parts therebetween. In the particular embodiment disclosed the part will move through seven successive steps from its starting point at the 6 o'clock position in FIG. 2 until it returns to such position for discharge from the ferris wheel. Two ferris wheels are shown in the embodiment, the first one 18 serving to provide for an initial washing of the part and the second one 20 serving as a drying station wherein jets may be supplied with air under pressure for drying the parts prior to their discharge from ferris wheel 20.

Figure 4:
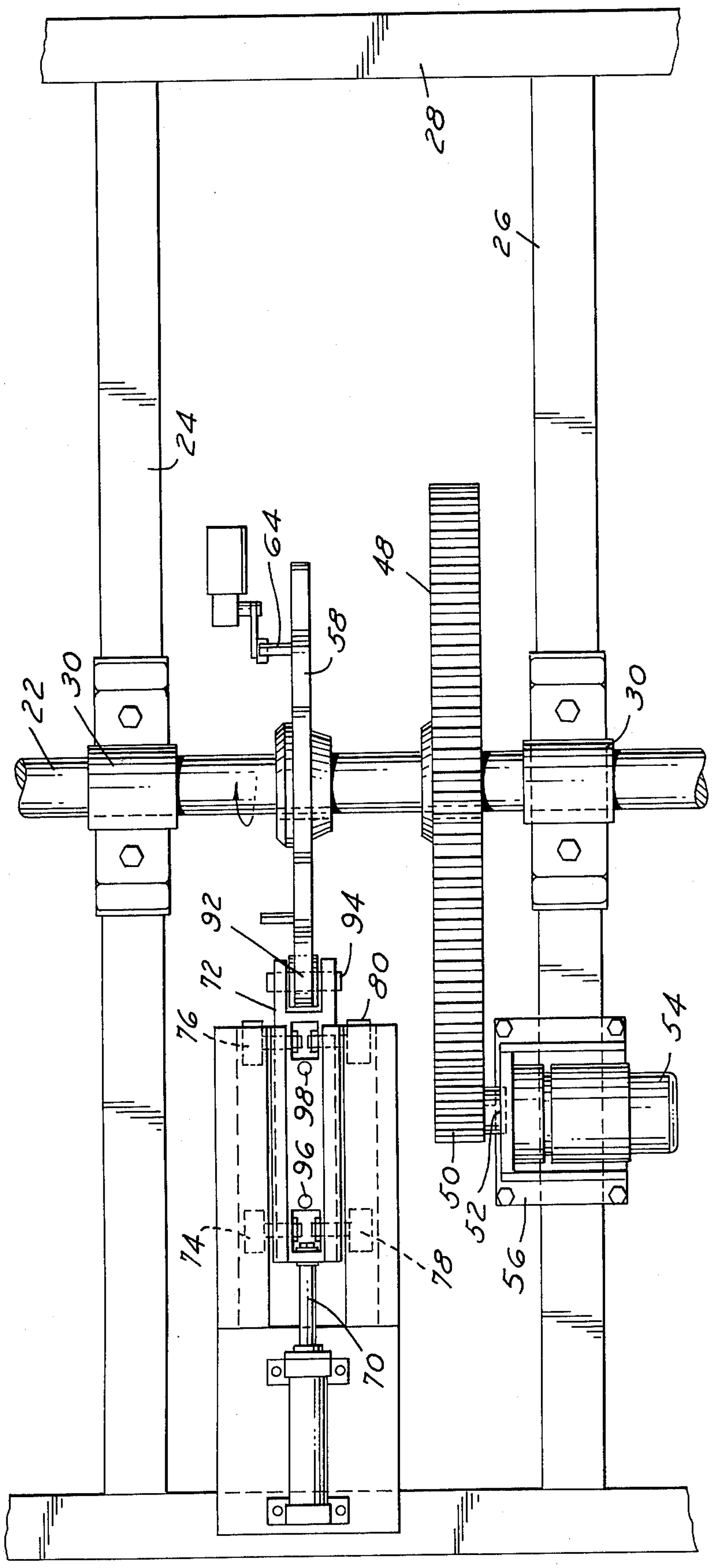
FIG. 4 is a top or plan view of the mechanism shown in FIG. 3.
Figure 5:
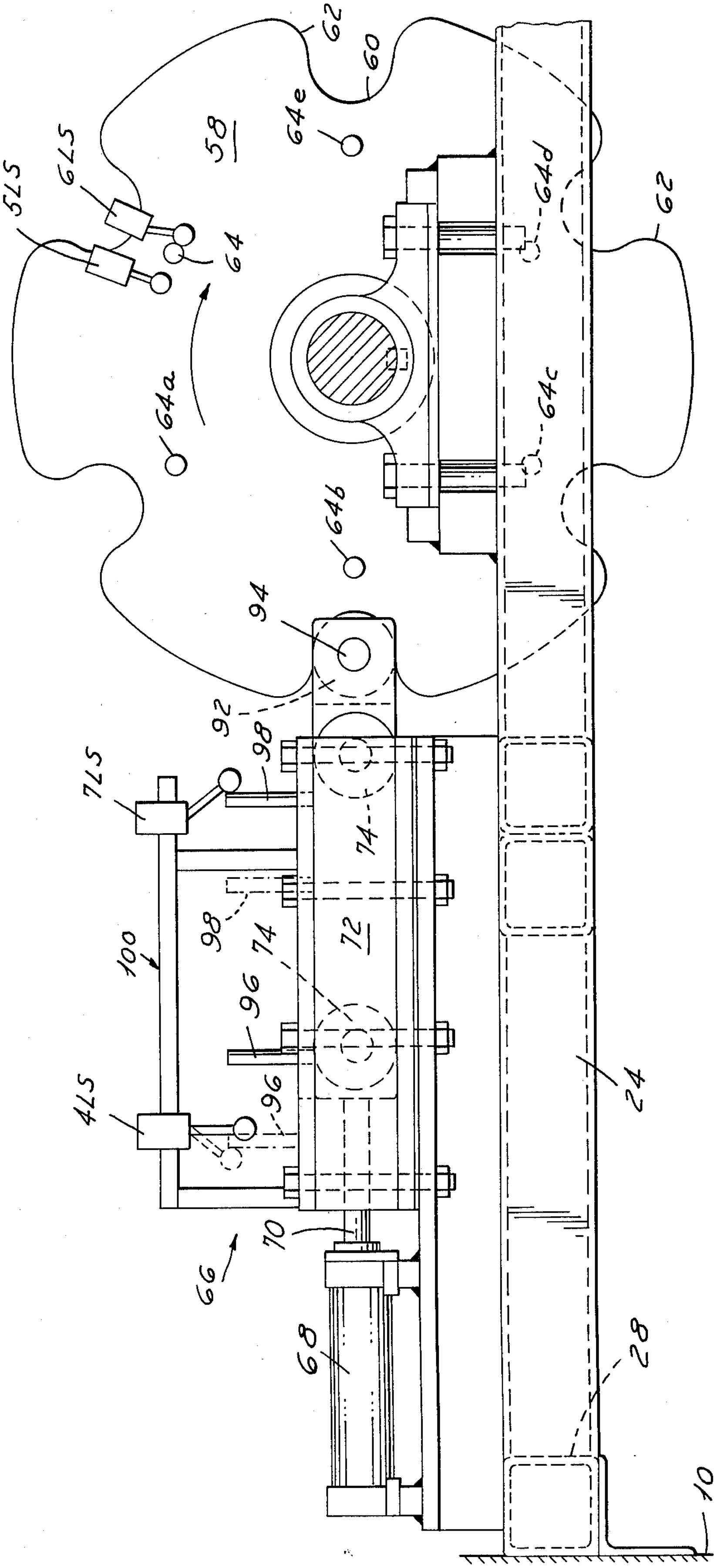
FIG. 5 is a side view taken on the line 5—5 of FIG. 3.

This invention is primarily concerned with the mechanism for driving the ferris wheel and for positioning successive parts supporting stations at its periphery in proper registry with the parts conveyor 12. In the disclosed embodiment the drive mechanism comprises a bull gear 48 mounted on shaft 22 in meshing engagement with a spur gear 50 carried by the shaft 52 of a rotary hydraulic motor 54 which is in turn carried by a suitable bracket arrangement 56 mounted on the cross-frame member 26. Upon rotation of the rotary motor spur gear 50 drives the bull gear 48 to cause rotation of the shaft 22 as indicated by the arrow in FIG. 4. Mounted on shaft 22 adjacent the bull gear 48 is a cam plate which is provided as shown in FIG. 5 with six equiangularly spaced radially outwardly opening recesses or notches 60 each of which is provided with a smoothly bevelled of chamfered mouth 62. The cam plate is also provided with equiangularly spaced axially extending switch actuating pins 64.

Figure 3:
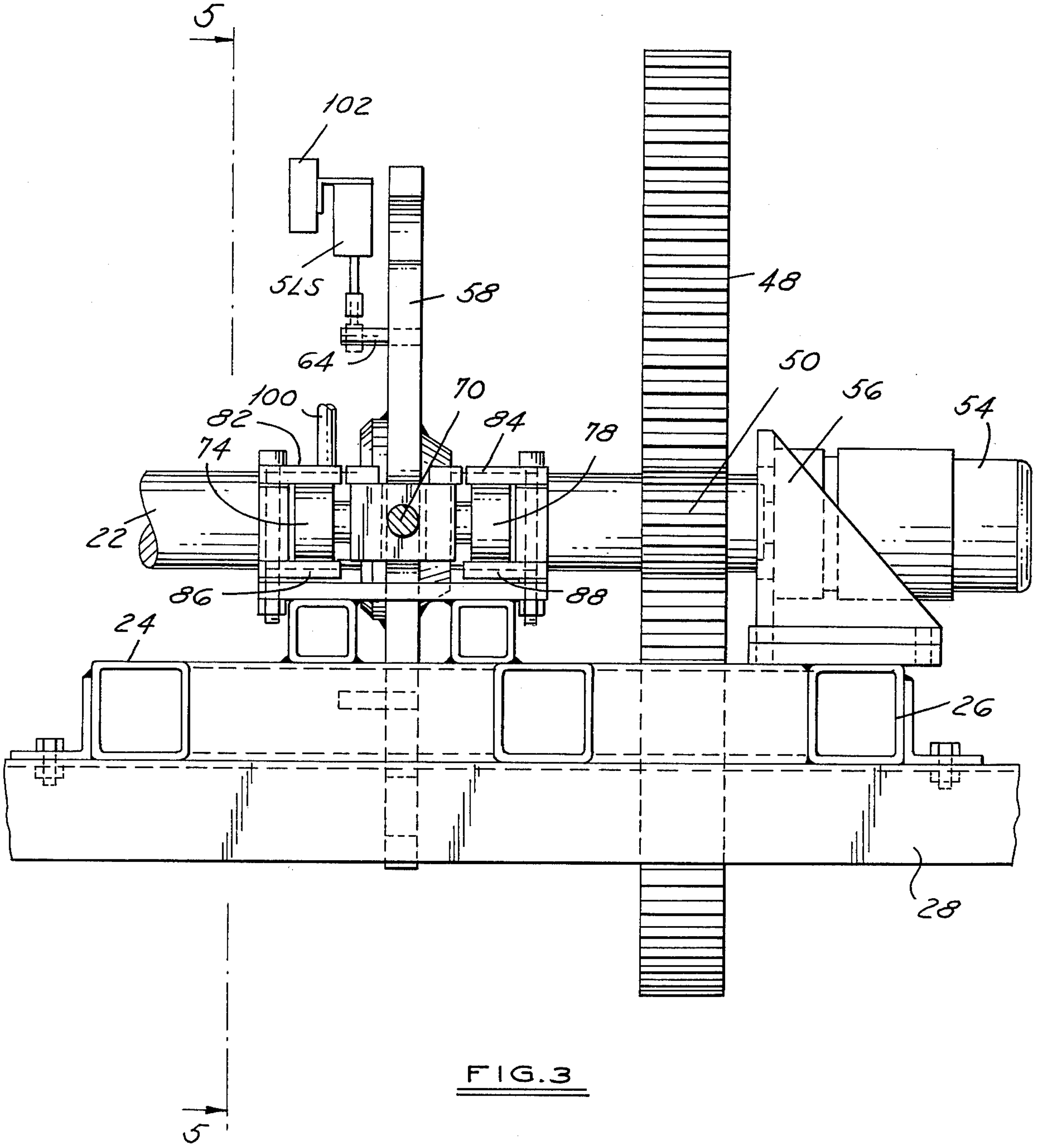
FIG. 3 is an enlarged fragmentary side elevation of a portion of the drive mechanism for the parts washer.

Disposed adjacent the periphery of the cam plate is ferris wheel positioning and locking means 66 for locating the wheels with successive parts supporting stations in aligned parts transfer registry with the parts conveyor and locking the wheels in such positions for parts transfer therebetween. Such means comprises, as shown in FIGS. 4 and 5, a hydraulic cylinder 68 having a piston rod 70 connected to a shuttle member 72 supported on rollers or the like 74, 76, 78 and 80 disposed between upper and lower guideway plates 82, 84, 86, and 88 which are assembled as shown in FIGS. 3 and 5 on the framework of the washer housing.

The shuttle member is carried by the wheels 74–80. The end of the shuttle member opposite the piston rod 70 is bifurcated to receive a cam roller 92 supported in the bifurcated end on a pin 94. The diameter of the cam roller 92 is sized to snuggly fit within each of the recesses 60. As the shuttle is extended from a retracted position closer to the cylinder 68 to the extended position shown in FIG. 5 the cam roller will abut the chamfered mouth of a recess 60 positioned in substantial registry with the path of travel of the shuttle serving to rotatably shift the cam plate slightly (to take up any play between teeth of the bull and spur gears) and in turn rotate shaft 22 slightly. The angular position of the shuttle and the recesses 60 in relation to the ferris wheel and the parts conveyor is such that when the shuttle is fully inserted into the recess the parts supporting station of the ferris wheel is in accurate parts transfer registry with the parts conveyor. The shuttle 72 and the roller 92 may be referred to as a "shot pin."

Mechanism is provided for controlling operation of the motor 54 and the positioning and locking means 66 through a cycle of operation, or rather successive cycles of operation. Such mechanism includes means responsive to the introduction of a part onto the parts conveyor to initiate operation of the positioning and locking means 66 to release the ferris wheels for rotation and for starting the motor 54 following transfer of parts between the conveyor and the ferris wheels 18 and 20.

The control mechanism is capable of slowly starting rotation of the ferris wheels and then rapidly accelerating them to a determined high speed movement and when the next successive parts supporting station approaches registry with the parts conveyor the control mechanism will rapidly and smoothly decelerate the ferris wheels and finally stop them in substantial transfer registry with the conveyor. Means are provided for controlling operation of the locating and locking means to cause the same to be actuated to accurately align and lock the parts supporting station of each ferris wheel with the transfer conveyor and following transfer of a part therebetween to unlock the ferris wheels for continued rotation.

Figure 6:
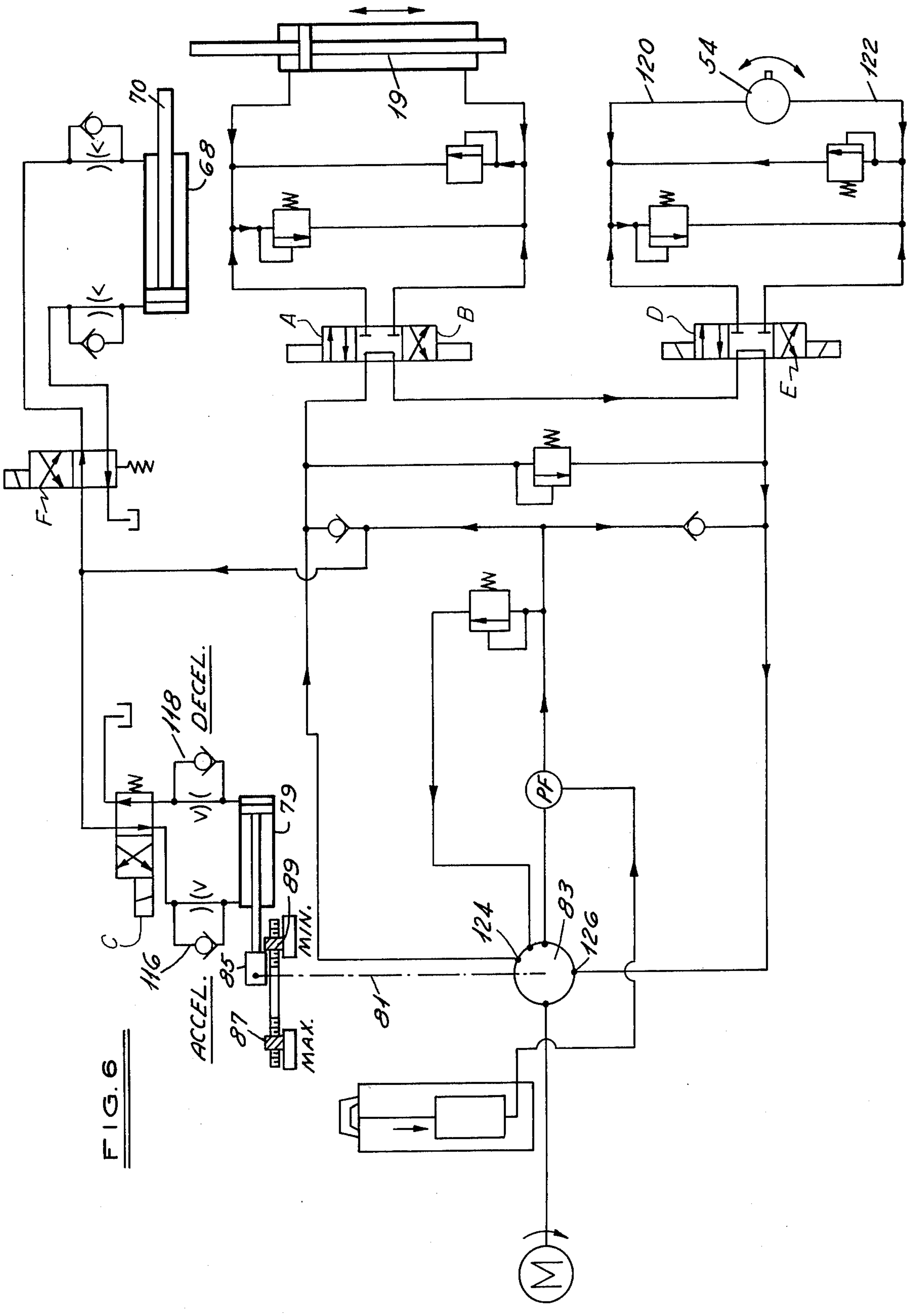
FIG. 6 is a schematic hydraulic diagram of the hydraulic system for powering the parts washer.
Figure 7:
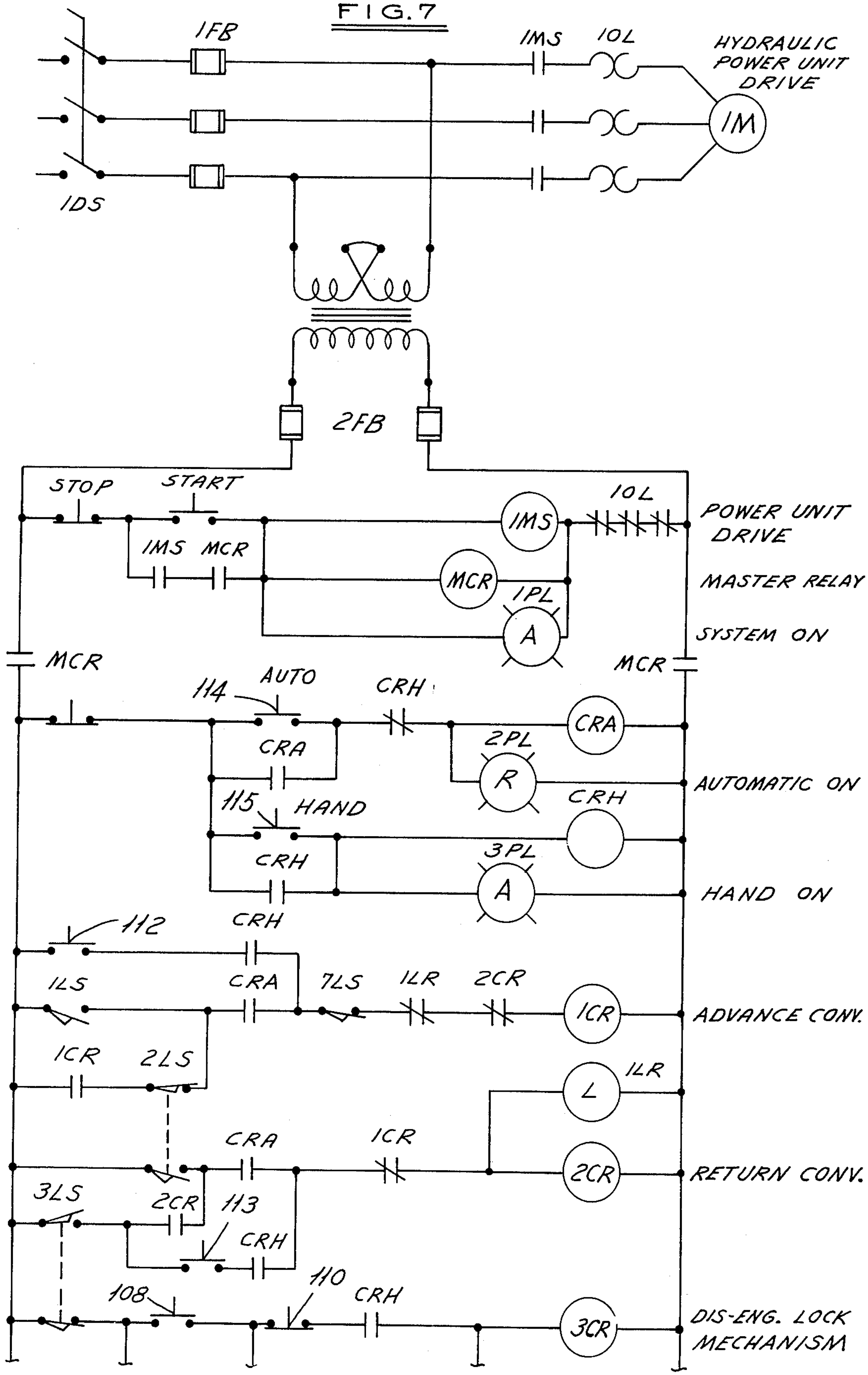
FIGS. 7 and 7A are electric schematic diagrams showing the electric control for the parts washer.
Figure 7A:
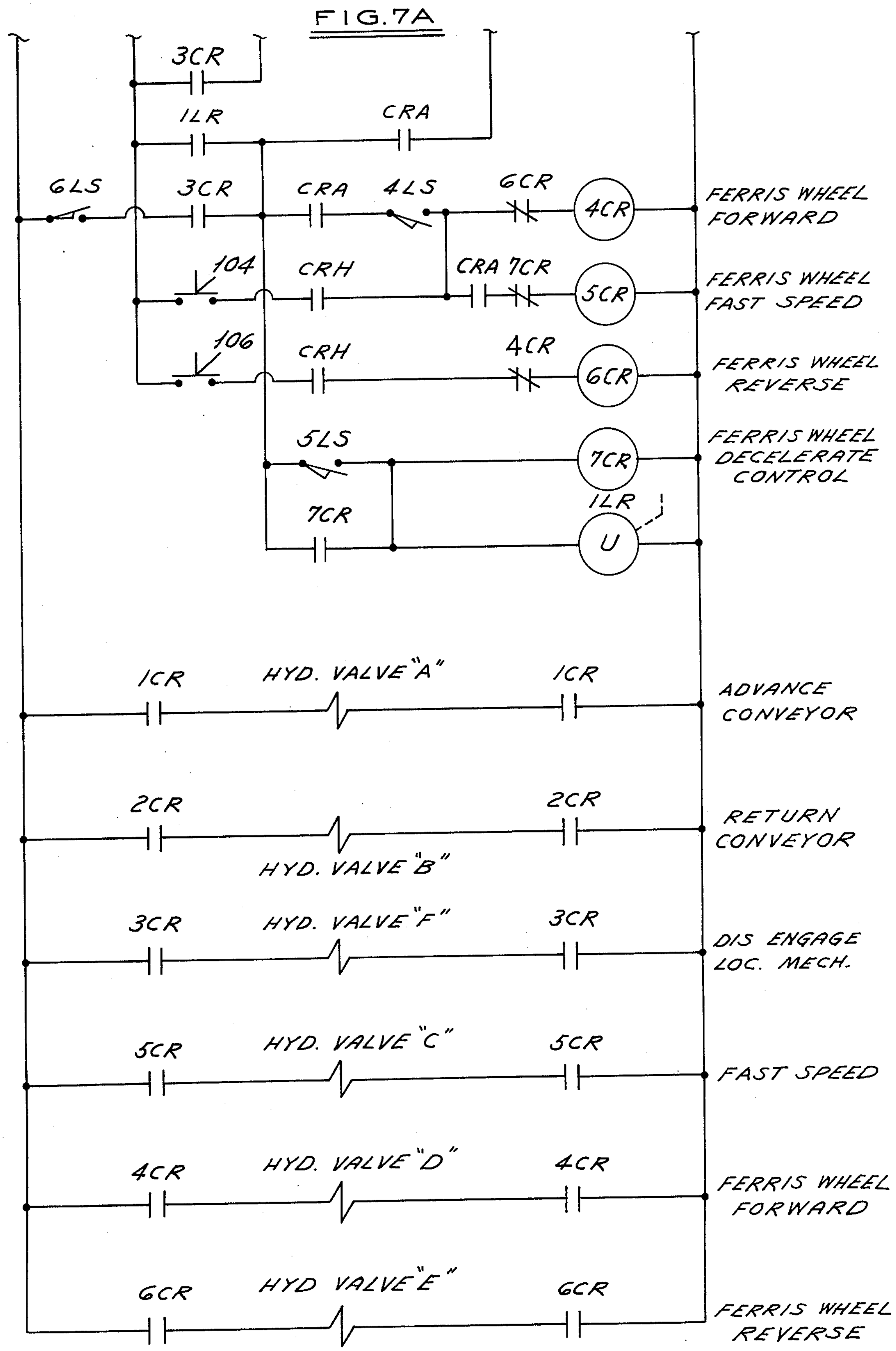

FIG. 6 is a schematic hydraulic diagram showing the various solenoid operated control valves, piping, fluid pressure actuators, pump and reservoir, which will be readily understood by one skilled in the art and therefore will not be described in detail though its general functioning will be delineated. This hydraulic system provides a hydrostatic type drive for the motor 54, viz, hydraulic fluid discharged from the motor is returned to the pump rather than to tank. FIGS. 7 and 7A which are schematic representations of an electric control circuit used in the control mechanism should be reviewed in conjunction with FIG. 6 and other figures of the drawing showing the various limit switches in the parts washer. The FIG. 7 and 7A depiction will be readily understood by those skilled in the art and therefore is not described in detail, but in the following description of the control mechanism and operation of the parts washer the general operation of the FIGS. 7 and 7A circuiting is reviewed.

Schematically shown in FIGS. 1 and 7 are three limit switches 1LS, 2LS and 3LS. 1LS is positioned to respond to introduction of part P-1 onto the parts conveyor 12. The part may be introduced in any suitable fashion as by manually placing the part in the position P-1 shown or by a mechanical transfer device. 2LS and 3LS are positioned to respond to the limits of reciprocation of the beam 16, and for this purpose I have schematically shown a switch tripper 17 depending from the beam with 2LS and 3LS disposed to have their upstanding switch arms engaged and shifted by the tripper to actuate the switches at opposite extremities of the beam travel. As hereinafter explained, when 1LS is tripped by the introduction of a part P-1, the beam 16 will be shifted to the left moving parts P-4 and P-10 out of the ferris wheel supporting stations of wheels 18 and 20, respectively aligned with the conveyor, and moving parts P-3 and P-9 into the just vacated supporting stations. When tripper 17 engages 2LS the beam 16 shifts back to the right to the position shown in FIG. 1 thereby tripping 3LS.

In FIG. 1 the means for reciprocating the beam 16 is shown schematically as comprising a fluid pressure actuator 19 having a piston rod connected to the beam such that upon pressurizing one end and then the other of cylinder 19 the beam is reciprocated. FIG. 6 shows the actuator 19 connected in a hydraulic circuit such that its operation is controlled by hydraulic solenoid valves A and B.

When 1LS is tripped by introduction of part P-1 onto the conveyor, this serves to energize solenoid valve A as shown in FIGS. 7 and 7A to cause pressurization of the actuator 19 and shifting of beam 16 to the left with the consequent functions mentioned above. With beam fully advanced and 2LS actuated, solenoid valve A is de-energized, latch relay 1LR and solenoid valve B are energized to reversely pressurize actuator 19 and shift beam 16 to the right actuating 3LS. With 1LR latched and 3LS actuated, solenoid valve F (see FIGS. 6 and 7A) is energized to pressurize actuator 68 to withdraw the shot pin from the cam plate recess 60 thereby unlocking the shaft 22 for rotation.

Upstanding switch actuating pins 96 and 98 mounted on the shuttle member 72 are shown in phantom and solid outlines to illustrate positions to which they are shifted at opposite extremities of the shuttle movement. A pair of limit switches 4LS and 7LS are mounted on a suitable frame 100 (see FIG. 5) supported in any convenient fashion as on the upper guideway 82 such that the depending switch arms thereof may be engaged by the pins 96 and 98 as shown in FIG. 5. When the shot pin is fully extended as shown in solid outline in FIG. 5 with its cam roller 92 seated in the recess 60, the pin 98 will have engaged the depending switch arm of 7LS to actuate the switch. Alternatively, when the shot pin has retracted to the left, pin 96 shown in phantom outline will have engaged the depending switch arm of 4LS to actuate the switch, and pin 98 will be in its phantom outline position out of contact with the switch arm of 7LS.

When 4LS is tripped by the shot pin shuttle moving to the left, solenoid valves C and D (see FIGS. 6 and 7A) are energized thus initiating operation of rotary fluid pressure motor 54 at a slow speed. Fluid pressure operated acceleration control actuator 79 (FIG. 6) is pressurized at its right hand end, and as its piston shifts to the left it moves a control arm 81 connected to the electrically driven fluid pressure pump 83 to quickly increase the discharge flow rate of the pump to the motor 54 thereby smoothly accelerating the rotational speed of the ferris wheels. Maximum speed is reached when the end 85 of the piston rod of actuator 79 reaches the adjustable abutment or stop 87, and the motor 54 continues to operate at its high speed with the adjustable maximum flow from the pump 83. Stop 89 is also adjustable so that the minimum discharge flow rate of the pump 83 may be determined to give a smooth start to the motor 54.

A pair of limit switches 5LS and 6LS are supported adjacent the cam plate (FIG. 5) on any suitable framing member as for example the member 102 which extends across the washen between opposite sides thereof. With the cam plate rotating in the direction of the arrow in FIG. 5, 5LS is first tripped by a pin 64 as a recess 60 approaches the path of travel of the shot pin, and this serves to slow the speed of the hydraulic motor 54. Such is accomplished because when 5LS is tripped this de-energizes solenoid valve C resulting in a reverse pressurization of the acceleration control actuator 79, causing its piston rod to move to the right, as shown in FIG. 6, thereby reducing the output of the pump 83 to the motor 54. With the shaft 22, ferris wheels 18 and 20, and the cam plate thus smoothly decelerated to a slow rate of rotation, the pin 64 on the cam plate is brought into contact with the trip arm of 6LS to trip such switch. Immediately upon actuation of this switch solenoid valve D is de-energized stopping all fluid flow to and from the motor 54 which is thereby stopped. The location of 6LS relative to the pin 64 is such that the motor stops with a recess 60 in substantial alignment with the path of movement of the cam roller 94 of the shot pin shuttle. Actuation of 6LS also de-energizes solenoid valve F which serves to reversely pressurize actuator 68 to shift the cam roller of the shot pin shuttle into chamfered mouth 62 of the recess 60 and thereby rotatably cam the plate 58 into accurate aligned registry with the path of the shuttle such that roller 92 seats down in the recess 60 as shown in FIG. 5. With the roller thus seated in the recess, a part supporting station in each of the ferris wheels 18 and 20 is disposed in aligned parts transfer registry with the parts conveyor 12, and upon operation of the latter parts will then be transferred to each ferris wheel and a part removed from each ahead of the part being loaded therein as above described. Slight misalignments between the parts supporting stations of the ferris wheels and the parts conveyor can occur through failure of the motor 54 to stop accurately or as a result of play in the mesh of the bull and spur gear teeth. Such misalignments are corrected by the camming action of the roller 92 entering the chamfered mouths 62 of the cam plate recesses 60 and seating in the recess.

When the roller 92 is fully seated in the recess 60 the trip pin 98 on the shuttle engages and actuates 7LS signalling that the ferris wheels are locked in proper parts transfer registry with the parts conveyor. Actuation of 7LS with 1LS actuated by a new part P-1 on the conveyor serves to energize solenoid valve A to pressurize actuator 19 and cause the parts conveyor to transfer parts therefrom into the aligned ferris wheel parts supporting stations and also transfer parts out of such stations for further transport by the parts conveyor as previously described, thus initiating a repetition of the cycle of operation.

The various components shown in FIG. 6 are commerically available in the trade. Thus the pump 83 may be a Sundstrand to which the accelerator control actuator 79 is connected to vary the pump discharge. Such actuation may be a Sheffer cylinder #CLH-D-2 sold by the Melvin Corporation of Bay City, Mich. Solenoid valves A and B, D and E are conventional double solenoid valves, while C and F are conventional spring return solenoid operated valves.

Referring to FIGS. 7 and 7A, various manual push button switches are shown to effect manual operation. Thus there are forward and reversing swiches 104 and 106 for manually controlling forward and reverse operation of the ferris wheels, manual switches 108 and 110 for respectively disengaging or engaging the shot pin mechanism with the cam plate, a manual switch 112 for causing the parts conveyor to shift to the left as viewed in FIG. 1, a switch 113 for causing it to shift to the right, and manual switches 114 and 115 for setting the circuit up for manual or automatic operation.

It will be understood that the control mechanism above described allows the user of the washer to vary the starting and stopping speeds of the ferris wheels by varying the adjusted position of the stops 87 and 89 between which the piston moves so that the speeds may be adjusted to the weight or mass of the parts being washed. Also, the rate of acceleration and deceleration of the ferris wheels may be adjusted for various masses of the parts to be washed. For this purpose a pair of adjustable flow control valves 116 and 118 are schematically shown in the circuit communicating with opposite ends of the acceleration actuator 79. These flow control valves may be of the kind manufactured by Parker-Hannifin Corporation under the designation "flow control #F-400-5-10." By adjusting them the flow rate into opposite ends of the actuator 79 may be varied and thereby the rates of movement of the piston in actuator 79. Accordingly, the pump 83 may have one flow rate increase to accelerate the ferris wheels from slow to fast speed and the same or a different flow rate decrease for slowing the ferris wheels preparatory to stopping them.

These varying rates of ferris wheel rotation and the smooth starting and stopping thereof, and the ability of the rotary fluid motor 54 to stop the wheels in substantial registry of the parts supporting stations with the transfer conveyor is in part, at least, attributable to the use of a hydrostatic drive for the motor. As will be noted in FIG. 6, the hydraulic circuit including lines 120 and 122 communicate through the solenoid valves D and E directly with the discharge 124 and inlet 126 of pump 83 and thereby the speed and operation of the motor is directly a function of the flow rates at the discharge and inlet of the pump.

I claim:

1. In an industrial parts washer of the ferris wheel type:

a ferris wheel having a plurality of circumaxially spaced apart parts supporting stations;

parts transfer mechanism for delivering parts to and receiving parts from successive stations of the ferris wheel when a station is in registry with the transfer mechanism;

a bull gear connected to the ferris wheel to rotate the same;

a spur gear in meshing engagement with the bull gear;

a rotary fluid pressure motor connected to the spur gear;

locking means for locking the ferris wheel against rotation when successive stations are in registry with the transfer mechanism;

and mechanism for controlling said motor and said locking means through a cycle of operation comprising;

a. means for initiating operation of said locking means to release the ferris wheel and for starting said motor following transfer of a part between the transfer mechanism and a parts supporting station;

b. means responsive to the approaching registry of a parts supporting station on the ferris wheel with the parts transfer mechanism for decelerating the speed of the motor;

c. and means responsive to substantial registry of such parts supporting station on the ferris wheel with the parts transfer mechanism for stopping the motor and causing said locking means to lock the ferris wheel in such registry.

2. The invention defined by claim 1 characterized in that a variable rate discharge hydraulic pump is connected to the motor by a hydrostatic circuit for varying the speed of the motor.

3. The invention defined by claim 1 characterized in that said locking means includes a disc-like member connected to rotate with the ferris wheel and having a plurality of circumferentially outwardly opening recesses angularly spaced apart equal to the angular spacing of the parts supporting stations on the ferris wheel, each recess having a chamfered entrance, and said locking means includes a fluid pressure actuator having a reciprocal portion moveable into and out of successive recesses and a camming portion cooperable with the chamfered entrance to angularly cam the ferris wheel into proper transfer registry with the parts transfer mechanism on movement into the recess.

4. The invention defined by claim 3 characterized in that the third and last mentioned means of claim 1 comprise electric switch means angularly positioned about the axis of the disc-like member to be actuated by travel of the disc-like member.

5. The invention defined by claim 1 characterized by means for providing a variable rate source of hydraulic pressure connected in a hydrostatic circuit to the motor and responsive to the second mentioned, third mentioned, and last mentioned means to supply fluid pressure to the motor to operate the same as aforesaid.

6. In an industrial parts washer of the ferris wheel type:

a ferris wheel having a plurality of circumaxially spaced apart parts supporting stations;

parts transfer mechanism for delivering parts to and receiving parts from successive stations of the ferris wheel when a station is in registry with the transfer mechanism;

fluid pressure motor means for driving the ferris wheel;

source means for providing a variable rate source of hydraulic pressure;

a hydrostatic circuit connecting the source means to the motor means and including valve means for controlling delivery and discharge of fluid pressure to said motor means;

locking means for locking the ferris wheel against rotation when successive stations are in registry with the transfer mechanism;

and mechanism for controlling said motor means and said locking means through a cycle of operation comprising;

a. means for initiating operation of said locking means to release the ferris wheel and for actuating said valve means to supply fluid pressure to the motor means following transfer of a part between the transfer mechanism and a part supporting station and for actuating said source means to supply an increasing rate of fluid pressure flow to the motor means;

b. means responsive to the approaching registry of a parts supporting station on the ferris wheel with the parts transfer mechanism for actuating said source means to supply a decreasing rate of fluid pressure to the motor means for decelerating the speed of the motor means;

c. and means responsive to substantial registry of such parts supporting station on the ferris wheel with the parts transfer mechanism for actuating said valve means to block admission and discharge of fluid pressure to the motor means for stopping the same and for causing said locking means to lock the ferris wheel in such registry.

* * * * *